(12) United States Patent
Kozuka et al.

(10) Patent No.: US 8,770,087 B2
(45) Date of Patent: Jul. 8, 2014

(54) HYDRAULIC SERVO-DRIVE DEVICE AND VARIABLE TURBO-SUPERCHARGER USING THE SAME

(75) Inventors: Daisuke Kozuka, Oyama (JP); Masayuki Tajima, Oyama (JP); Mitsumasa Akashi, Oyama (JP); Shuuji Hori, Oyama (JP)

(73) Assignee: Komatsu Ltd., Tokyo (JP)

( * ) Notice: Subject to any disclaimer, the term of this patent is extended or adjusted under 35 U.S.C. 154(b) by 778 days.

(21) Appl. No.: 12/933,479

(22) PCT Filed: Mar. 2, 2009

(86) PCT No.: PCT/JP2009/053806
§ 371 (c)(1),
(2), (4) Date: Sep. 20, 2010

(87) PCT Pub. No.: WO2009/116380
PCT Pub. Date: Sep. 24, 2009

(65) Prior Publication Data
US 2011/0011077 A1 Jan. 20, 2011

(30) Foreign Application Priority Data

Mar. 21, 2008 (JP) .................. 2008-074404

(51) Int. Cl.
*F02B 37/24* (2006.01)
*F15B 9/09* (2006.01)

(52) U.S. Cl.
USPC .................. 91/378; 92/5 R; 415/158

(58) Field of Classification Search
CPC ...................................... F01B 37/24
USPC .................. 91/378, 422; 92/5 R; 415/158
See application file for complete search history.

(56) References Cited

U.S. PATENT DOCUMENTS

| | | | | |
|---|---|---|---|---|
| 2,959,156 | A * | 11/1960 | Dreptin ........................ | 91/378 |
| 4,804,913 | A * | 2/1989 | Shimizu et al. ................ | 92/5 R |
| 5,868,552 | A | 2/1999 | McKean et al. | |
| 5,941,684 | A | 8/1999 | Parker | |
| 6,058,962 | A | 5/2000 | Hayashi et al. | |
| 6,895,751 | B1 * | 5/2005 | Greentree ...................... | 60/602 |
| 7,290,476 | B1 * | 11/2007 | Glasson ......................... | 92/5 R |
| 8,186,158 | B2 * | 5/2012 | Nishiyama et al. ............ | 60/602 |
| 2007/0194260 | A1 | 8/2007 | Seiyama et al. | |

FOREIGN PATENT DOCUMENTS

| | | |
|---|---|---|
| EP | 1 264 078 B1 | 12/2005 |
| JP | 4-91328 A | 3/1992 |
| JP | 7-190227 A | 7/1995 |
| JP | 8-121404 A | 5/1996 |
| JP | 11-72008 A | 3/1999 |
| JP | 11-247807 A | 9/1999 |
| JP | 2000-282964 A | 10/2000 |

(Continued)

*Primary Examiner* — F. Daniel Lopez
(74) *Attorney, Agent, or Firm* — Holtz Holtz Goodman & Chick PC

(57) ABSTRACT

A hydraulic servo drive device includes: a pilot spool for switching supply and shutoff of oil; a servo piston slid in accordance with the pilot spool; a stroke sensor for detecting a displacement of the servo piston; a first hydraulic chamber in which oil for moving the servo piston is flowed; a first piston oil path for communicating a pump port to which oil is supplied from a pump with a first hydraulic chamber; and a discharge circulating oil path for communicating the first hydraulic chamber with a drain port.

6 Claims, 13 Drawing Sheets

(56) References Cited

FOREIGN PATENT DOCUMENTS

| JP | 2003-527522 A | 9/2003 |
| JP | 3820273 B2 | 9/2006 |
| JP | 2007-107389 A | 4/2007 |
| WO | WO 98/05545 A1 | 2/1998 |

* cited by examiner

HYDRAULIC SERVO-DRIVE DEVICE AND VARIABLE TURBO-SUPERCHARGER USING THE SAME

This application is a U.S. National Phase Application under 35 USC 371 of International Application PCT/JP2009/053806 filed Mar. 2, 2009.

TECHNICAL FIELD

The present invention relates to a hydraulic servo drive device and a variable geometry turbocharger using the same.

BACKGROUND ART

There has been conventionally known a variable geometry turbocharger in which an opening area of a nozzle for ejecting exhaust gas into an exhaust turbine can be adjusted. In such a variable geometry turbocharger, at a low speed revolution zone of an engine having a small amount of exhaust gas, a gap between exhaust inlet walls forming a nozzle is reduced to reduce an opening area thereof, thereby increasing a flow speed of exhaust gas flowing into the exhaust turbine. Thus, the rotary energy of a turbine can be increased to enhance supercharging performance of a charging compressor.

It has been proposed that a slide mechanism in which one of the exhaust inlet walls is slid toward the other exhaust inlet is employed for adjusting the gap between the exhaust inlet walls, and the slide mechanism is driven by a hydraulic servo drive device (for example, Patent Document 1). In such a hydraulic servo drive device, a hydraulic servo piston is reciprocated by switching oil supply for hydraulic chambers provided on both sides of the hydraulic servo piston to transfer this reciprocating motion to the slide mechanism, thereby controlling an opening degree.

However, in Patent Document 1, when a stroke sensor and the like are attached to the hydraulic servo drive device provided in the variable geometry turbocharger, the turbine is heated to a high temperature. Accordingly, the stroke sensor and the like which are vulnerable to heat may be damaged from the heat of the turbine. For this reason, it has been known that a cooling path or space is provided only for cooling the stroke sensor in, for instance, a hydraulic servo drive device provided in an EGR (Exhaust Gas Recirculation) valve device (Patent Documents 2 to 4).

Patent Document 1: JP-T-2003-527522
Patent Document 2: JP-A-7-190227
Patent Document 3: JP-A-2000-282964
Patent Document 4: JP-A-2007-107389

DISCLOSURE OF THE INVENTION

Problems to be Solved by the Invention

However, the hydraulic servo drive devices of Patent Documents 2 to 4 require a cooling-water circulating oil path provided only for cooling the stroke sensor, or a space provided only for introducing air for cooling, which may cause a complicated structure of the device and raise the production cost. Moreover, the structure for introducing air into the space is not applicable, since a cooling efficiency of the structure is extremely deteriorated in a place where the air to be introduced is at high temperature.

An object of the present invention is to provide a hydraulic servo drive device that can cool a section thereof such as a stroke sensor, which is vulnerable to heat, by circulating oil without providing an oil path only for circulating a cooling-water, and to provide a variable geometry turbocharger using the hydraulic servo drive device.

Means for Solving the Problems

A hydraulic servo drive device according to an aspect of the invention includes: a pilot spool slid by a pilot pressure and switching between supply and shutoff of oil; a biasing unit that biases the pilot spool; a servo piston slid in accordance with the pilot spool; a detector that detects a displacement of the servo piston; a pump hydraulic chamber into which oil for moving the servo piston is flowed; a pump port to which oil from a pump is supplied; a piston oil path that communicates the pump port with the pump hydraulic chamber; and a discharge circulating oil path that communicates the pump hydraulic chamber with a drain port.

In the hydraulic servo drive device according to the aspect of the invention, it is desirable that the pump port and the drain port are communicated with each other at least when the pilot spool and the servo piston are balanced.

In the hydraulic servo drive device according to the aspect of the invention, it is desirable that the piston oil path and the discharge circulating oil path are provided in the servo piston.

It is desirable that the hydraulic servo drive device according to the aspect of the invention further includes a housing that houses the servo piston, in which the detector includes a stator provided on the housing and a movable member that is provided on an end of the servo piston to move with the servo piston, the pump hydraulic chamber is formed, in the housing, between the movable member provided on the servo piston and the stator provided on the housing, a center hole penetrating along a sliding direction and housing the pilot spool is formed in the servo piston, and a pilot hydraulic chamber in which the pilot pressure works is formed between an end of the pilot spool and the movable member provided to the servo piston in the center hole of the servo piston.

According to the aspect of the invention, since the piston oil path for flowing oil into the pump hydraulic chamber and the discharge circulating oil path for discharging oil in the pump hydraulic chamber are provided, oil from the pump port is supplied to the pump hydraulic chamber via the piston oil path while being discharged from the discharge circulating oil path in order to maintain the oil pressure of the pump hydraulic chamber. Thus, oil is circulated through the pump hydraulic chamber. At this time, by providing the detector at a position where the detector is cooled by oil in the pump hydraulic chamber, the detector can be favorably cooled by the circulating oil without an exclusive cooling-medium circulating path and can be prevented from being heated to high temperatures.

Moreover, oil is simultaneously flowed into and discharged from the pump hydraulic chamber when the pilot spool and the servo piston are balanced (neutral state). When the pilot spool and the servo piston are balanced at any position in a range of the strokes, oil is reliably circulated in the pump hydraulic chamber.

A variable geometry turbocharger according to another aspect of the invention includes: exhaust inlet walls provided facing to each other at a nozzle at an outer side of a turbine wheel; a plurality of nozzle vanes disposed between the exhaust inlet walls at a predetermined interval along a circumferential direction of the turbine wheel; a slide mechanism that advances and retracts, in a facing direction, one of the exhaust inlet walls relative to the other of the exhaust inlet walls; and the hydraulic servo drive device of the above aspect of the invention for driving the slide mechanism.

In the variable geometry turbocharger according to the another aspect of the invention, it is desirable that oil for driving the hydraulic servo drive device is a lubricating oil of an engine in which the variable geometry turbocharger is installed.

In the variable geometry turbocharger according to the another aspect of the invention, it is desirable that the lubricating oil is pressurized and supplied to the hydraulic servo drive device.

According to the aspect of the invention, another oil pressure source is not required by pressurizing the lubricating oil of the engine by, for instance, a boost pump, thus reducing the production cost. Accordingly, a discharge pressure of the pressurized pump is usable as a starting pressure of a proportional pressure control valve.

For instance, by applying a predetermined electric current to the proportional pressure control valve, a pilot pressure corresponding to the electric current can be generated to move the pilot spool to a position corresponding to the pilot pressure.

BEST MODE FOR CARRYING OUT THE INVENTION

Figure 1:
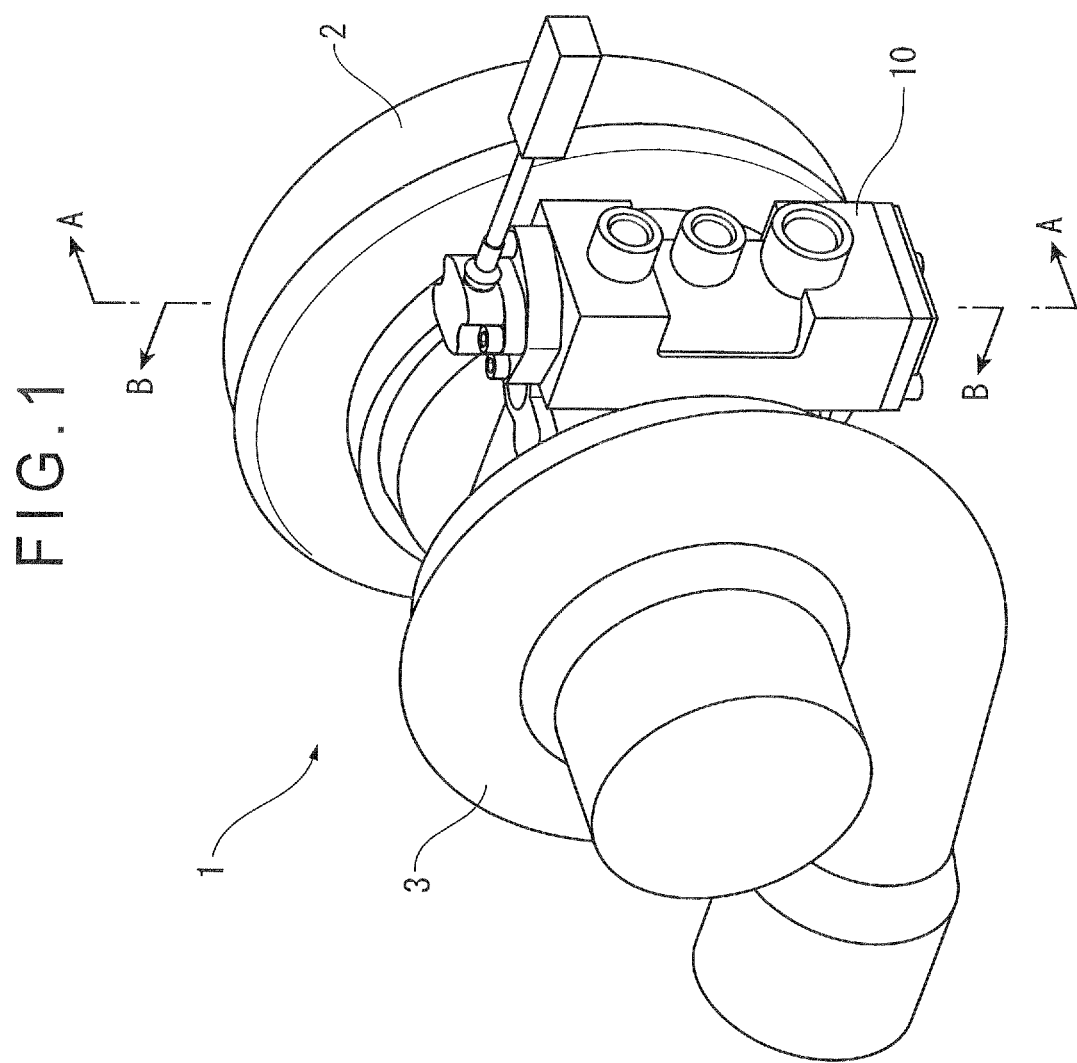
FIG. 1 is a perspective view showing a variable geometry turbocharger according to the invention.

Exemplary embodiment(s) of the invention will be described below with reference to the attached drawings. In the second exemplary embodiment and other exemplary embodiments to be described below, an arrangement identical with or similar to that in the first exemplary embodiment described below will be denoted by the same reference numerals, and thus an explanation thereof will be simplified or omitted.

First Exemplary Embodiment

A first exemplary embodiment of the invention will be described below with reference to the drawings.

Figure 2:
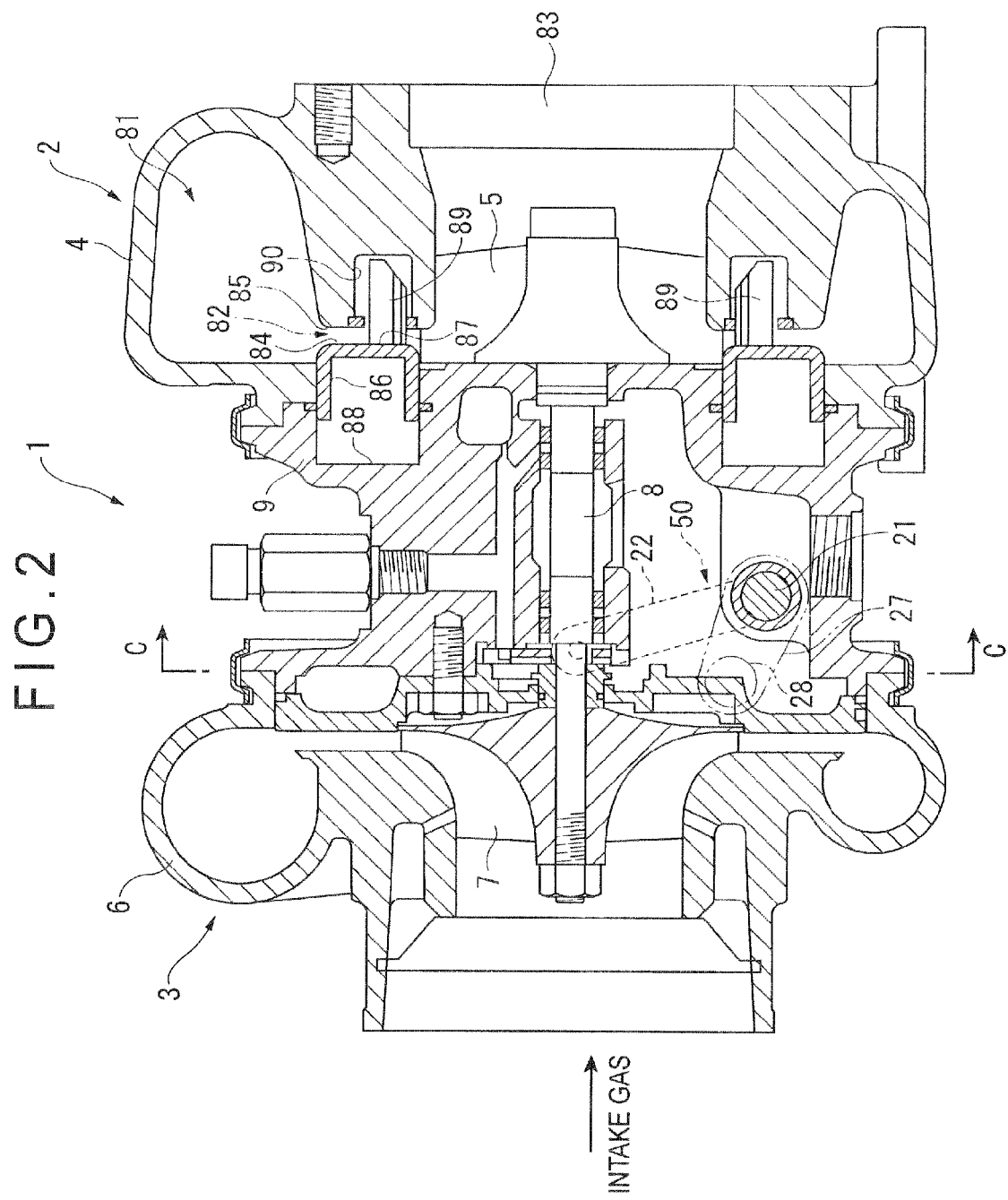
FIG. 2 is a cross-sectional view showing the variable geometry turbocharger.

FIG. 1 is a perspective view showing a variable geometry turbocharger 1 with use of a hydraulic servo drive device 10 according to this exemplary embodiment of the invention. FIG. 2 is a cross-sectional view showing the variable geometry turbocharger 1.

With reference to FIGS. 1 and 2, the variable geometry turbocharger 1 is provided with a turbine 2 on the right of the drawings, a compressor 3 on the left of the drawings and the hydraulic servo drive device 10 between the turbine 2 and the compressor 3, and is attached to an engine body (not shown). A turbine wheel 5 is housed in a turbine housing 4 adjacent to the turbine 2, and a compressor impeller 7 is housed in a compressor housing 6 adjacent to the compressor 3. A shaft 8 is integrally provided to the turbine wheel 5, and the compressor impeller 7 is attached to an end of the shaft 8. The shaft 8 is rotatably supported by a center housing 9. Accordingly, the rotation of the turbine wheel 5 rotated by exhaust gas is transmitted to the compressor impeller 7 via the shaft 8, and the rotation of the compressor impeller 7 compresses and charges intake gas.

The turbine housing 4 is provided with a volute-shaped exhaust inlet path 81 for introducing exhaust gas from the engine body. A nozzle 82 for injecting the exhaust gas toward the turbine wheel 5 is circumferentially and consecutively provided on the exhaust inlet path 81. After the exhaust gas injected from the nozzle 82 rotates the turbine wheel 5, the exhaust gas is exhausted from an exhaust exit 83. The nozzle 82 is formed by a pair of exhaust inlet walls 84 and 85 that face each other.

One exhaust inlet wall 84 is formed by a lateral side 87 of an annular movable ring 86 having a square C-shaped cross section. The movable ring 86 is housed in a housing space 88 provided to the center housing 9. A plurality of nozzle vanes 89 that project toward the other exhaust inlet wall 85 are attached on the lateral side 87 of the movable ring 86 at equal circumferential intervals. A circumferentially continuous recess 90 is formed on the exhaust inlet wall 85, and an end of each nozzle vane 89 is housed within the recess 90. With this structure, when the movable ring 86 is advanced and retracted by a slide mechanism 50 described below, the exhaust inlet wall 84 is moved toward and away from the exhaust inlet wall 85 to change the opening area of the nozzle 82.

Since an arrangement of the compressor 3, which is the same as that of a typical turbocharger, is known, a detailed description thereof will be omitted. The slide mechanism 50 will be described in detail below.

Figure 3:
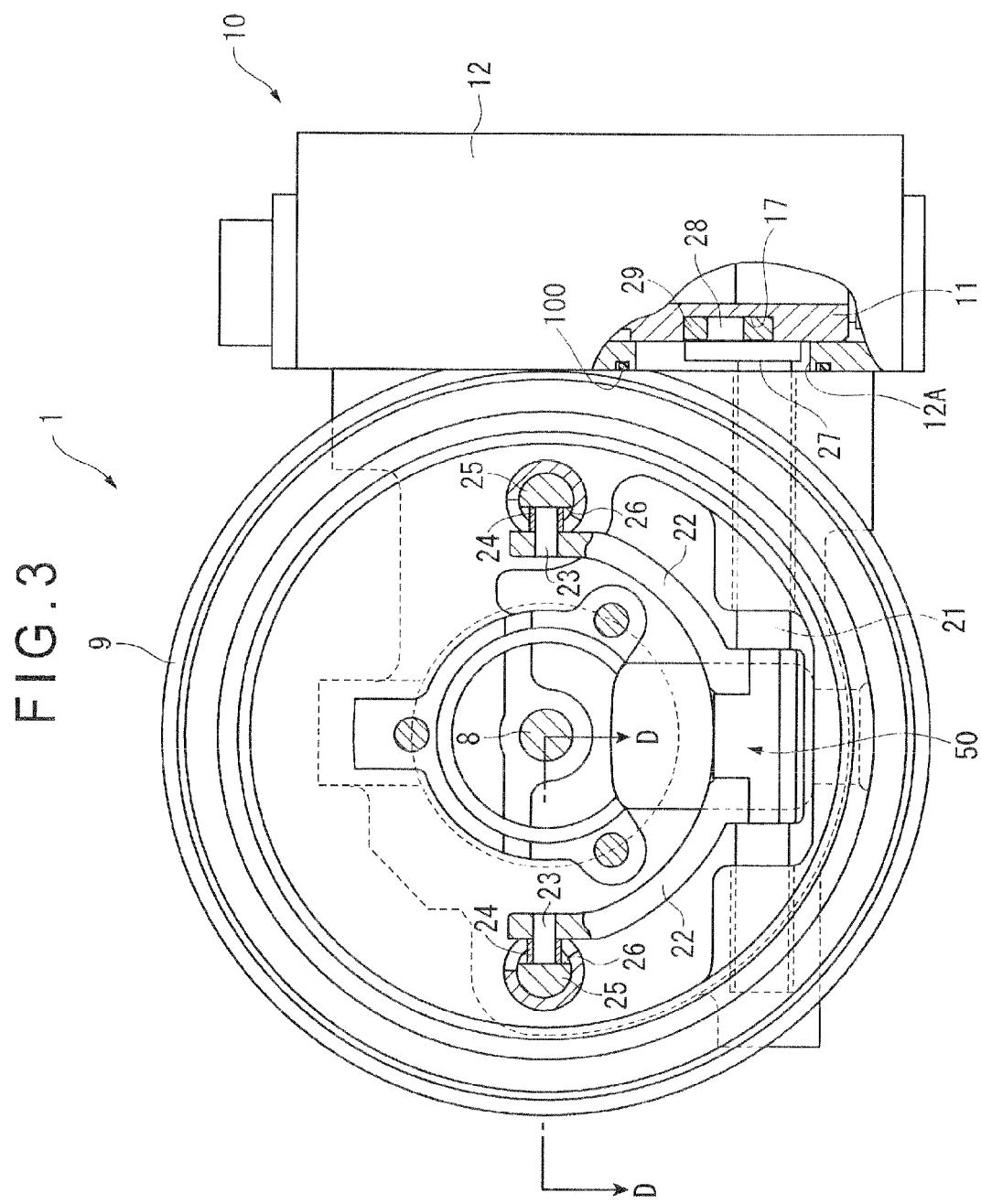
FIG. 3, which shows a slide mechanism of the variable geometry turbocharger, is a view on arrow C-C in FIG. 2.
Figure 4:
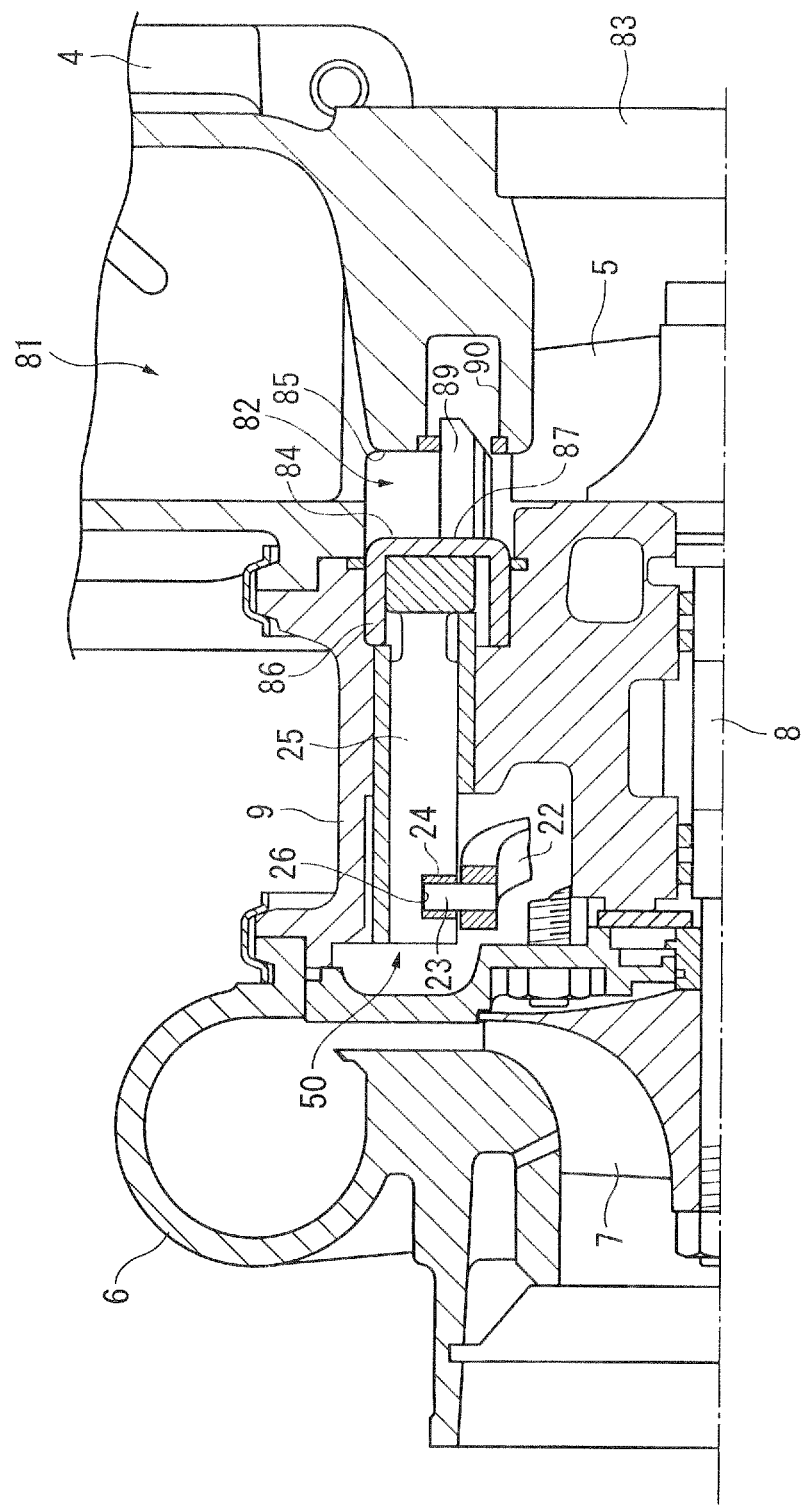
FIG. 4, which shows a cross section of a main section of the slide mechanism, is a view on arrow D-D in FIG. 3.

The slide mechanism 50 has a structure in which a driveshaft 21 inserted through a lower side of the center housing 9 is rotated to advance and retract the above-noted movable ring 86. FIGS. 3 and 4 show a main section of the slide mechanism 50. In FIGS. 3 and 4, a pair of arc-shaped arms 22, 22 extending upward is fixed at intermediate positions of the driveshaft 21. A pin 23 projecting horizontally outward is attached to an end of each arm 22, and a slider 24 is fitted in the pin 23. The slider 24 is slidably fitted with a slide groove 26 adjacent to a base end of a support rod 25 parallel to the shaft 8. A distal end of the support rod 25 is bonded to a rear side of the movable ring 86.

Accordingly, when the driveshaft 21 is rotated, the arm 22 swings along an axial direction of the shaft 8, so that the support rod 25 is moved to move the movable ring 86, thus advancing and retracting the exhaust inlet wall 84 relative to the exhaust inlet wall 85. In the slide mechanism 50, the support rod 25 having the arm 22, the pin 23, the slider 24, and the slide groove 26 provides a converter that converts the rotary movement of the driveshaft 21 to the advancing and retracting movement of the exhaust inlet wall 84.

Figure 5:
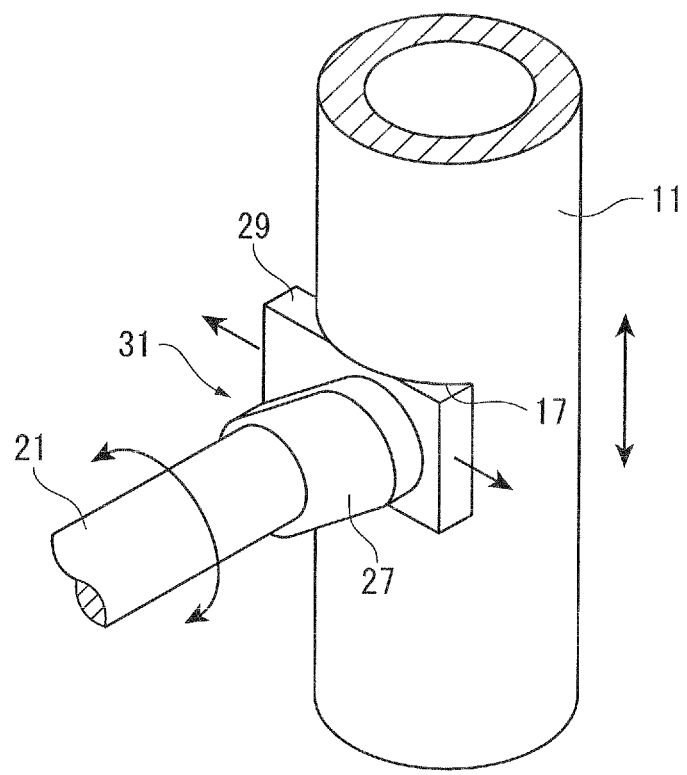
FIG. 5 is a perspective view showing a connector between the slide mechanism and a hydraulic servo drive device.
Figure 6:
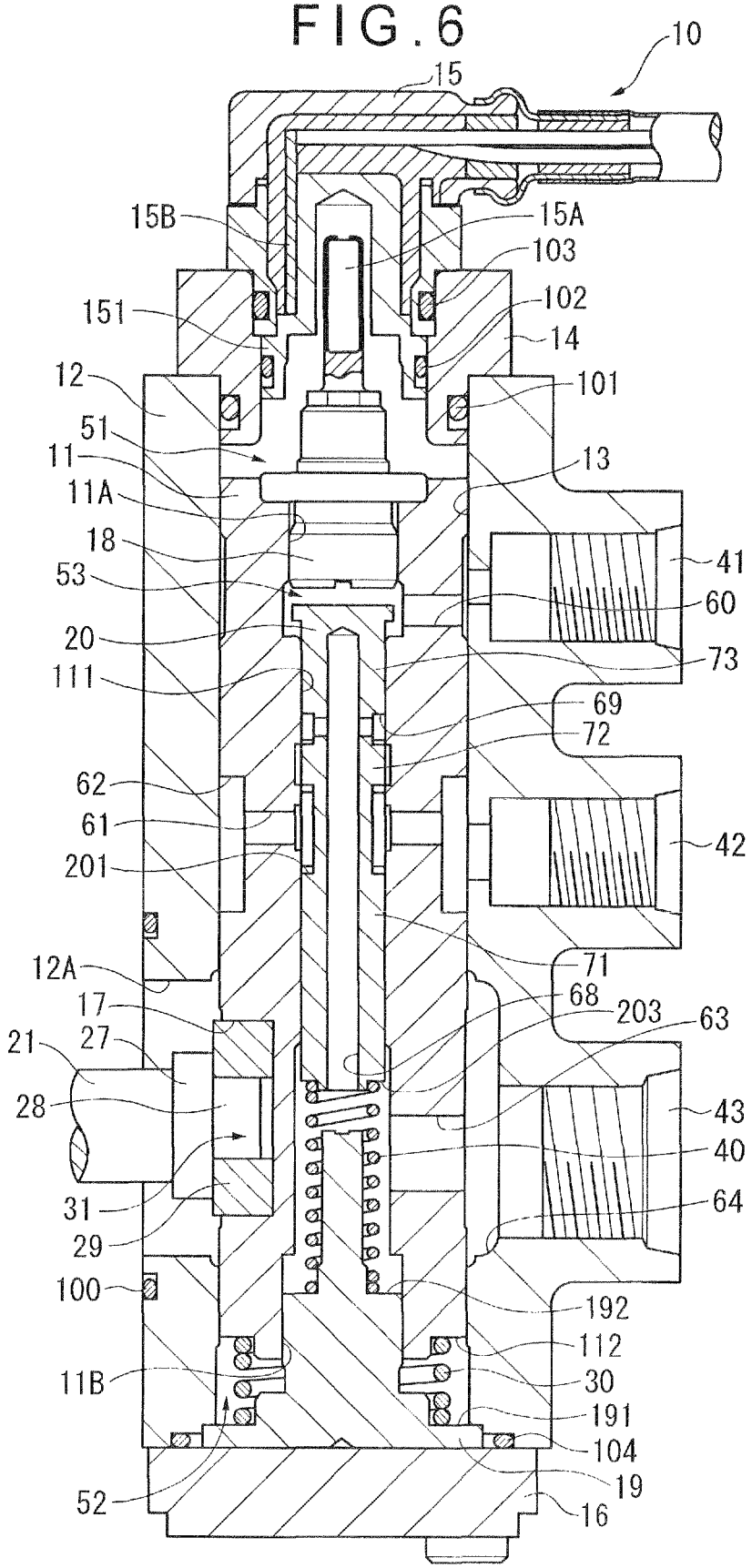
FIG. 6, which shows a cross section of a hydraulic servo drive device according to a first exemplary embodiment of the invention, is a view on arrow A-A in FIG. 1.
Figure 7:
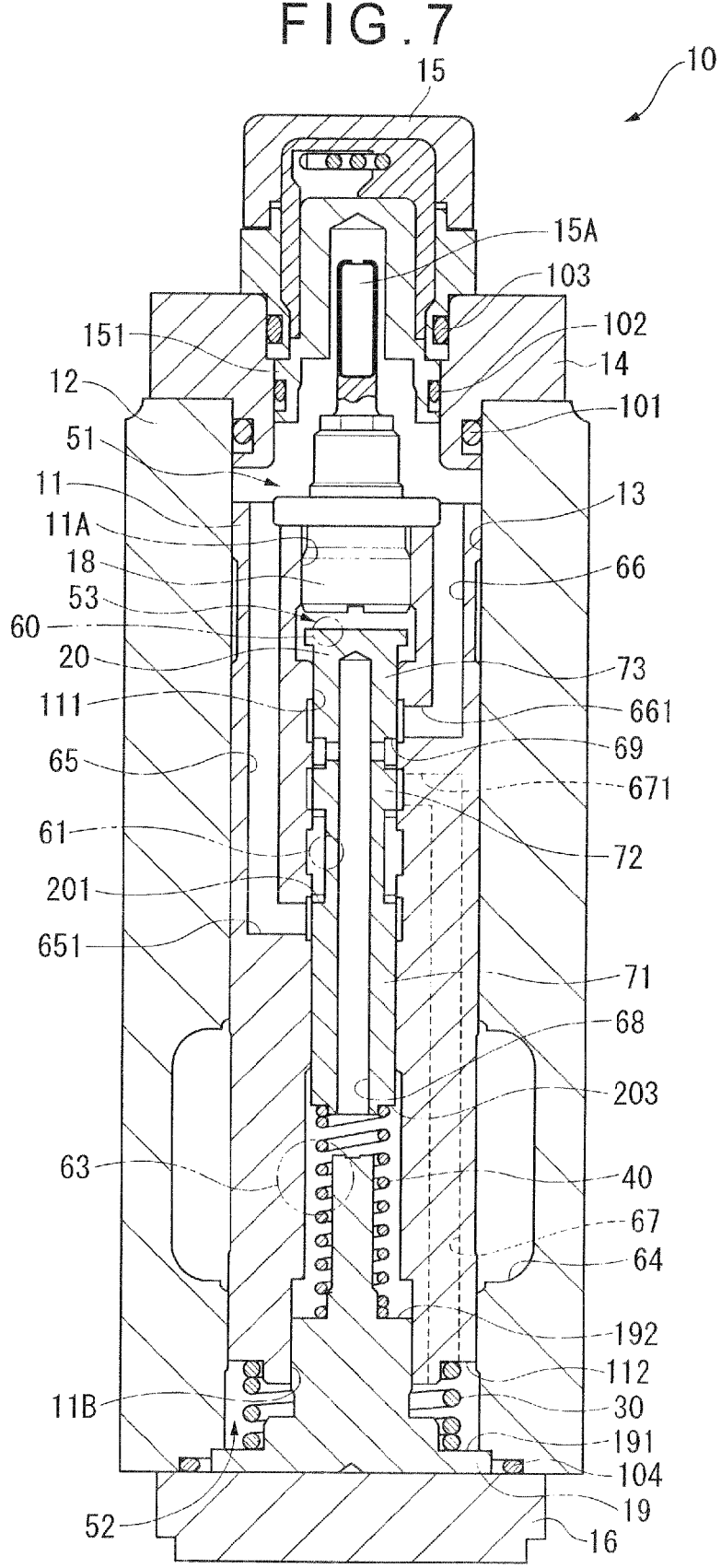
FIG. 7, which shows a cross section of the hydraulic servo drive device, is a view on arrow B-B in FIG. 1.
Figure 8:
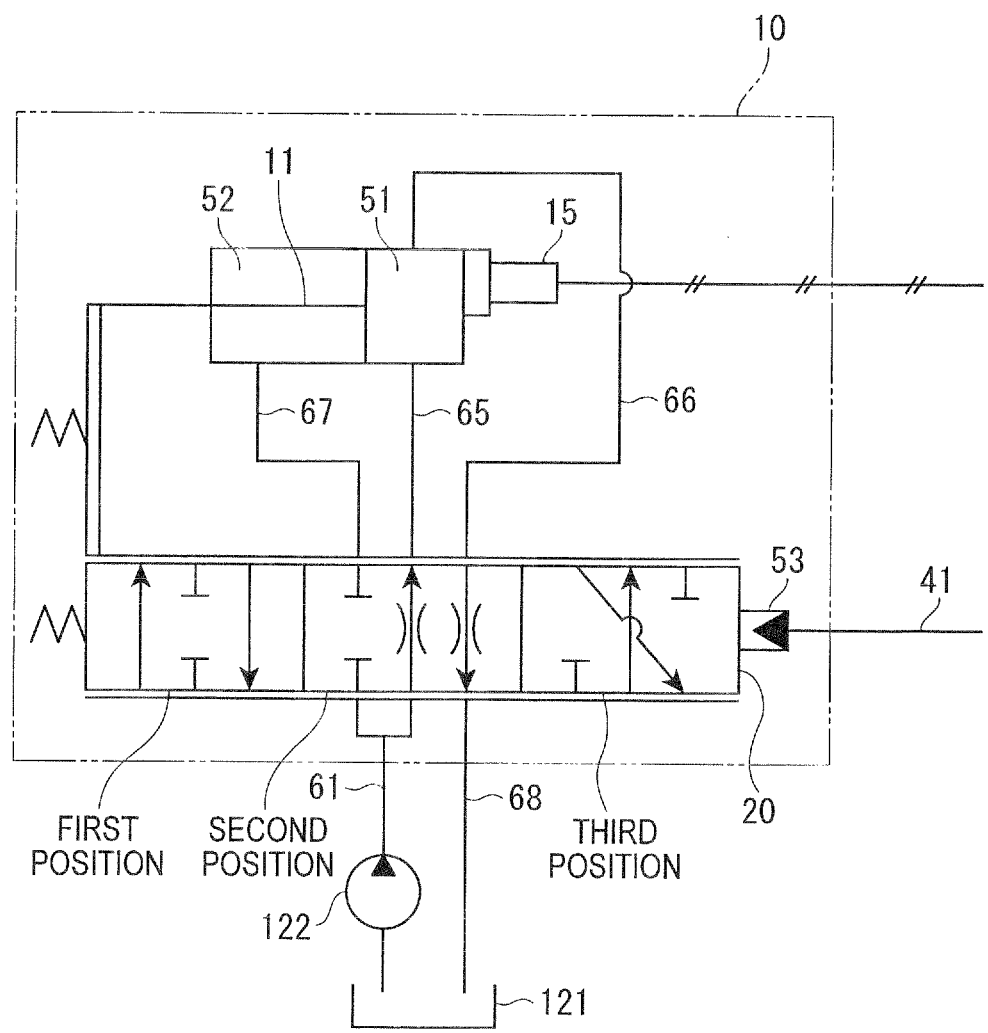
FIG. 8 illustrates a hydraulic circuit showing a four-port, three-position servo valve.

The driveshaft 21 of the slide mechanism 50 is rotationally driven by the hydraulic servo drive device 10 via an arm 27 provided on an end of the driveshaft 21. The hydraulic servo drive device 10 will be described in detail below. FIG. 5 is a perspective view showing a connector 31 between the slide mechanism 50 and the hydraulic servo drive device 10. FIG. 6 is a view on arrow A-A in FIG. 1. FIG. 7 is a view on arrow B-B in FIG. 1. FIG. 8 illustrates a hydraulic circuit of the hydraulic servo drive device 10. The hydraulic servo drive device 10 will be described with reference to FIGS. 6 and 7. A six-port, three-position servo valve is used in the hydraulic servo drive device 10 according to this exemplary embodiment.

As shown in FIG. 5, in outline, the hydraulic servo drive device 10 has a structure in which a servo piston 11 is vertically reciprocated to rotate the driveshaft 21. Thus, a slide groove 17 perpendicular to an axial direction of the servo piston 11 is provided on an outer circumference thereof, a pin 28 projecting toward the slide groove 17 is provided on the arm 27 adjacent to the driveshaft 21; a slider 29 is fitted into the pin 28; and the slider 24 is slidably fitted with the slide groove 17.

In other words, in this exemplary embodiment, another converter is provided, which includes the slide groove 17, the slider 29, the pin 28, and the arm 27 and converts the advancing and retracting movement of the servo piston 11 into the rotary movement of the driveshaft 21. With the vertical movement of the servo piston 11, the slider 29 moves up and down and slides along the slide groove 17, and the movement of the slider 29 and the rotation of the pin 28 allow an arc movement of the arm 27 to rotate the arm 27. The rotary movement of the driveshaft 21 drives the slide mechanism 50 as described above, thus adjusting a nozzle opening degree of the variable geometry turbocharger 1.

As shown in FIG. 6, the hydraulic servo drive device 10, which includes a substantially cylindrical housing 12, is attached to the variable geometry turbocharger 1 via an O-ring 100 for sealing a periphery of an opening 12A provided in the housing 12.

The housing 12 has a vertically penetrating cylindrical cylinder chamber 13 inside thereof, and the servo piston 11 that slides in the penetrating direction is housed in the cylinder chamber 13. A cylindrical cover 14 is attached to an upper end of the cylinder chamber 13 via an O-ring 101 in the drawing. A stroke sensor 15 is attached as a detector to an inner circumference of the cover via O-rings 102 and 103. The stroke sensor 15 seals the upper end of the cylinder chamber 13. A cover 16 seals a lower end of the cylinder chamber 13 via an O-ring 104 in the drawing.

On a side of the housing 12, the opening 12A is provided for communicating an inside of the housing 12 with an outside thereof. The connector 31 between the driveshaft 21 and the servo piston 11 is formed at a position corresponding to the opening 12A.

On a side of the housing 12 remote from the opening 12A, a pilot port 41 for supplying a pilot pressure, a pump port 42 for supplying oil from a pump 122 (FIG. 8), and a drain port 43 for returning the oil are provided.

Next, the servo piston 11 will be described.

Openings 11A and 11B (numbered from an upper opening in the drawing) are provided on ends of the servo piston 11 housed in the cylinder chamber 13. A center hole 111 that penetrates along a sliding direction is provided in the servo piston 11.

An attachment member 18 to which a movable member 15A of the stroke sensor 15 is attached is screwed in the opening 11A of the servo piston 11. A first hydraulic chamber 51 is formed as a pump hydraulic chamber between the attachment member 18 and a cap member 151 adjacent to a stator 15B (e.g. hall IC). The stator 15B detects a magnetic field of the movable member 15A that moves up and down in accordance with the movement of the servo piston 11. Accordingly, the movable member 15A moves together with the servo piston 11 and can sense a displacement of the servo piston 11, eventually a nozzle opening degree of the variable geometry turbocharger 1.

A base member 19 that is fixed to an end of the cylinder chamber 13 is attached to the opening 11B at a lower part of the drawing. With this arrangement, the servo piston 11 is slid to the base member 19 in the cylinder chamber 13. A second hydraulic chamber 52 is formed between a retaining seat 191 of the base member 19 and a lower end surface 112 of the servo piston 11. A spring 30 is held in the second hydraulic chamber 52. The servo piston 11 is biased by the spring 30 in a direction separating from the base member 19. The spring 30 serves for keeping the servo piston 11 biased to an upper position in the drawing when an oil supply is stopped for some reason.

A pilot spool 20 is slidably disposed in the center hole 111. A pilot hydraulic chamber 53 is formed between a lower end surface of the attachment member 18 and an upper end surface of the pilot spool 20 in the center hole 111. The pilot hydraulic chamber 53 and a pilot port 41 provided in the housing 12 are constantly communicated with each other via a servo oil path 60 of the servo piston 11. Thus, the pilot spool 20 is slid in the center hole 111 by the pilot pressure supplied and discharged from the pilot port 41 to the pilot hydraulic chamber 53.

The servo piston 11 is pierced in a radial direction substantially at a center of the sliding direction thereof to provide a pressure oil path 61 for communicating the center hole 111 with the pump port 42 of the housing 12. Through the pressure oil path 61, oil from the pump 122 is flowed into the center hole 111. An outer side of the pressure oil path 61 is open to a broad shallow-groove 62 formed in an elongated hole on an outer circumference of the servo piston 11. Since the shallow groove 62 has a predetermined vertical length, the pressure oil path 61 and the pump port 42 are constantly communicated with each other within the stroke of the servo piston 11. In addition, an inner side of the pressure oil path 61 is open to a groove 201 formed along the sliding direction on an outer circumference of the pilot spool 20.

In addition, the servo piston 11 is provided with a return oil path 63 that communicates the center hole 111 with the drain port 43 of the housing 12 to return the oil in the center hole 111 to an oil pan 121 (FIG. 8). An outer side of the return oil path 63 is open to a shallow groove 64 annularly shaped in the housing 12 and on the outer circumference of the servo piston 11, so that the return oil path 63 and the drain port 43 are constantly communicated with each other within the stroke of the servo piston 11.

As shown in FIG. 7, a first piston oil path 65 and an discharge circulating oil path 66 are also provided in the servo piston 11 for communicating the center hole 111 with the first hydraulic chamber 51 on an upper part of the drawing. A second piston oil path 67 is provided for communicating the center hole 111 with the second hydraulic chamber 52. An oil path 651 is provided on a lower side of the first piston oil path 65 for communicating the outside of the servo piston 11 with the center hole 111. Another oil path 661 that communicates with the center hole 111 is provided on a lower side of the discharge circulating oil path 66.

The oil path 651 of the first piston oil path 65 is positioned lower than the pressure oil path 61 (FIG. 6) in FIG. 7. The second oil path 661 of the discharge circulating oil path 66 is positioned higher than the pressure oil path 61 in FIG. 7. A communicating portion 671, which is provided adjacent to an upper end of the second piston oil path 67 for communicating with the center hole 111, is positioned between the oil paths 651 and 661.

The pilot spool 20 includes first, second and third spool lands 71, 72 and 73 (numbered from a lower spool land of the drawing) on an outer circumference thereof. A return oil path 68, which is open toward a lower part of the drawing, is provided in the pilot spool 20 and is communicated with a groove 69 provided between the second and third spool lands 72 and 73. In addition, since a lower side of the return oil path 68 is opened, the return oil path 68, the return oil path 63, and the drain oil path 43 are communicated with each other.

Here, the oil path 651 of the first piston oil path provided in the servo piston 11 is communicated with or interrupted from a groove 201 provided between the first and second spool lands 71 and 72 of the pilot spool 20 in accordance with vertical sliding of the servo piston 11 and the pilot spool 20. The oil path 661 of the discharge circulating oil path 66 is similarly communicated with or interrupted from a groove 69 provided between the second and third spool lands 72 and 73.

As shown in FIG. 7, a relation between the oil paths 651 and 661 of the servo piston 11 and the grooves 69 and 201 of the pilot spool 20 is designated as follows. Specifically, when the oil path 651 of the first piston oil path 65 is slightly communicated with the groove 201 of the pilot spool 20, the oil path 661 of the discharge circulating oil path 66 is designated to be slightly communicated with the groove 69 of the pilot spool 20. With this arrangement, the oil supplied from the first piston oil path 65 to the first hydraulic chamber 51 is drained to the return oil path 68 of the pilot spool 20 through the discharge circulating oil path 66, thus being circulated around the stroke sensor 15.

A spring 40 is interposed as a biasing means between a lower end surface 203 of the pilot spool 20 and a retaining seat 192 of the base member 19. The spring 40 biases the pilot spool 20 in a direction separating from the base member 19. By a pilot pressure in the pilot hydraulic chamber 53, the pilot spool 20 moves downwards against a biasing force of the spring 40. Alternatively, the pilot spool 20 moves upwards by the biasing force thereof.

Next, an operation of a hydraulic servo drive device 10 will be described with reference to FIG. 7. FIG. 7 shows a balanced state (neutral state) between the servo piston 11 and the pilot spool 20. Herein, the "balanced state" means that a working force on the pilot spool 20 (the pilot pressure in the pilot hydraulic chamber 53) is balanced with the biasing force of the spring 40 and that a downward force urging the servo piston 11 downwards (a working pressure on the first hydraulic chamber 51) is balanced with an upward force urging the servo piston 11 upwards (a total force of a force by a working pressure on the second hydraulic chamber 52 and a force of the spring 30).

Under this balanced state, the oil path 651 and the groove 201 are communicated and the oil path 661 and the groove 69 are communicated (namely underlap), thereby constituting the pilot spool 20. An external force is applied on the servo piston 11 by the driveshaft 21, but seldom influences on the servo piston 11.

In the underlap, the oil path 651 of the first piston oil path 65 is slightly communicated with the groove 201 of the pilot spool 20 and the oil from the pump 122 is supplied to the first hydraulic chamber 51 via the first piston oil path 65. On the other hand, in the discharge circulating oil path 66 communicated with the first hydraulic chamber 51, the oil path 661 of the discharge circulating oil path 66 is slightly communicated with the groove 69 of the pilot spool 20, so that the oil supplied into the first hydraulic chamber 51 is slightly drained to the return oil path 63 via the return oil path 68. Thus, the oil is constantly circulated in the first hydraulic chamber 51 under the balance state. Accordingly, surroundings of the stroke sensor 15 can be cooled by a flow of the oil used for moving the servo piston 11 and the stroke sensor 15 can be prevented from being heated to high temperatures.

For lowering the pilot spool 20 from the balanced state shown in FIG. 7, the pilot pressure in the pilot hydraulic chamber 53 is increased, thereby lowering the pilot spool 20 against the biasing force of the spring 40. When the pilot spool 20 is lowered, an opening degree at which the oil path 651 of the first piston oil path 65 is communicated with the groove 201 of the pilot spool 20 is increased, thereby increasing a flow of the oil supplied from the pump 122 into the first hydraulic chamber 51. After the oil is supplied into the first hydraulic chamber 51, when the downward force urging the servo piston 11 downwards (the working pressure on the first hydraulic chamber 51) is larger than the upward force urging the servo piston 11 upwards (the total force of the force by the working pressure on the second hydraulic chamber 52 and the force of the spring 30), the servo piston 11 is lowered.

In other words, the servo piston 11 is lowered in accordance with the pilot spool 20. The pilot spool 20 is lowered to a position where the pilot pressure and the spring 40 are balanced and is stopped. While the pilot spool 20 is lowered, communication between the oil path 661 of the discharge circulating oil path 66 and the groove 69 of the pilot spool 20 is interrupted. When the pilot spool 20 is stopped, the servo piston 11, which is following the pilot spool 20, is stopped when the downward force urging the servo piston 11 downwards (the working pressure on the first hydraulic chamber 51) is balanced with the upward force urging the servo piston 11 upwards (the total force of the force of the working pressure on the second hydraulic chamber 52 and the force of the spring 30).

Accordingly, an opening area between the oil path 651 and the groove 201 is decreased and an opening area between the oil path 661 and the groove 69 is increased. Consequently, whereas the oil is supplied into the first hydraulic chamber 51 although the oil supplied again into the first hydraulic chamber 51 is decreased, the oil is drained from the return oil path 68 through the discharge circulating oil path 66 and the groove 69. Specifically, when the pilot spool 20 is balanced in the same manner as in the balanced state shown in FIG. 7 before the pilot spool 20 is lowered, the oil supplied from the first piston oil path 65 into the first hydraulic chamber 51 is discharged from the discharge circulating oil path 66, so that the surroundings of the stroke sensor 15 can be cooled and the stroke sensor 15 can be prevented from being heated to high temperatures. The pilot pressure is controlled by a proportional pressure control valve 141.

For moving the pilot spool 20 upwards from the balanced state shown in FIG. 7, by decreasing the pilot pressure in the pilot hydraulic chamber 53, a force working on the pilot spool 20 (pilot pressure) becomes smaller than the biasing force of the spring 40, thereby moving the pilot spool 20 upwards. When the pilot spool 20 is moved upwards, communication between the oil path 651 of the first piston oil path 65 and the groove 201 of the pilot spool 20 is interrupted, and the communicating portion 671 of the second piston oil path 67 and the groove 201 are communicated. Accordingly, the oil from the pump 122 is not supplied to the first hydraulic chamber 51 but to the second hydraulic chamber 52 via the second piston oil path 67. On the other hand, an opening degree at which the oil path 661 of the discharge circulating oil path 66 is communicated with the groove 69 becomes larger, so that the oil in the first hydraulic chamber 51 is drained through the return oil path 68 of the pilot spool 20. When the downward force urging the servo piston 11 downwards (the working pressure on the first hydraulic chamber 51) is smaller than the upward force urging the servo piston 11 upwards (the total force of the force by the working pressure on the second hydraulic chamber 52 and the force of the spring 30), the servo piston 11 is moved upwards.

In other words, the servo piston 11 is moved upwards in accordance with the pilot spool 20. The pilot spool 20 is moved upwards to a position where the pilot pressure and the spring 40 are balanced and is stopped. While the pilot spool 20 is moved upwards, communication between the oil path 651 of the first piston oil path 65 and the groove 201 of the pilot spool 20 is interrupted. When the pilot spool 20 is stopped, the servo piston 11, which is following the pilot spool 20, is stopped when the downward force urging the servo piston 11 downwards (the working pressure on the first hydraulic chamber 51) is balanced with the upward force urging the servo piston 11 upwards (the total force of the force by the working pressure on the second hydraulic chamber 52 and the force of the spring 30).

Accordingly, an opening area between the oil path 661 and the groove 69 is decreased and the oil path 651 and the groove 201 are slightly communicated with each other. Consequently, whereas the oil supplied into the first hydraulic chamber 51 is increased, the oil in the first hydraulic chamber 51 is drained from the return oil path 68 through the groove 69. Specifically, the oil supplied from the first piston oil path 65 into the first hydraulic chamber 51 is discharged from the discharge circulating oil path 66, so that the surroundings of the stroke sensor 15 can be cooled and the stroke sensor 15 can be prevented from being heated to high temperatures.

The hydraulic servo drive device 10 is shown as a hydraulic circuit view in FIG. 8. The hydraulic servo drive device 10 includes the servo piston 11, the pilot spool 20, the stroke sensor 15, the pilot port 41 and the oil pan 121, which constitutes a six-port, three-position servo valve.

In FIG. 8, at a second position in the pilot spool 20, since a center upper port is connected to the first piston oil path 65 and a center lower port is connected to the pressure oil path 61, the first piston oil path 65 and the pressure oil path 61 are communicated, so that the oil supplied from the pump 122 is supplied to the first hydraulic chamber 51. Moreover, since a right upper port is connected to the discharge circulating oil path 66 and a right lower port is connected to the return oil path 68, the discharge circulating oil path 66 and the return oil path 68 are communicated, so that the oil in the first hydraulic chamber 51 is drained to the oil pan 121 via the return oil path 68.

When the pilot pressure in the pilot hydraulic chamber 53 is increased from the state shown in FIG. 8, a third position of the pilot spool 20 is moved toward the left of the drawing to a position where the second position is located before the movement. Accordingly, at the third position, a left upper port is connected to the second piston oil path 67 and a right lower port is connected to the return oil path 68, whereby the oil in the second hydraulic chamber 52 is drained to the oil pan 121 via the return oil path 68. Since the center upper port is connected to the first piston oil path 65 and the center lower port is connected to the pressure oil path 61, the oil from the pump 122 is supplied to the first hydraulic chamber 51. By connection between the right upper port and the discharge circulating oil path 66, communication between the discharge circulating oil path 66 and the return oil path 68 is interrupted and the oil in the first hydraulic chamber 51 is not drained. Following the movement of the pilot spool 20, the servo piston 11 is moved and is stopped at the second position in a balanced state.

When the pilot pressure in the pilot hydraulic chamber 53 is decreased from the state shown in FIG. 8, a first position of the pilot spool 20 is moved toward the right of the drawing to a position where the second position is located before the movement. With this movement, since a left upper port is connected to the second piston oil path 67 at the first position and a left lower port is connected to the pressure oil path 61, the second piston oil path 67 and the pressure oil path 61 are communicated, so that the oil from the pump 122 is supplied to the second hydraulic chamber 52. Further, since the center upper port is connected to the first piston oil path 65 and the center lower port is connected to the pressure oil path 61, communication between the first piston oil path 65 and the pressure oil path 61 is interrupted, so that the oil from the pump 122 is not supplied to the first hydraulic chamber 51. Further, since a right upper port is connected to the discharge circulating oil path 66 and a right lower port is connected to the return oil path 68, the discharge circulating oil path 66 and the return oil path 68 are communicated, so that the oil in the first hydraulic chamber 51 is drained to the oil pan 121 via the return oil path 68. Following the movement of the pilot spool 20, the servo piston 11 is moved and is stopped at the second position in a balanced state.

Figure 9:
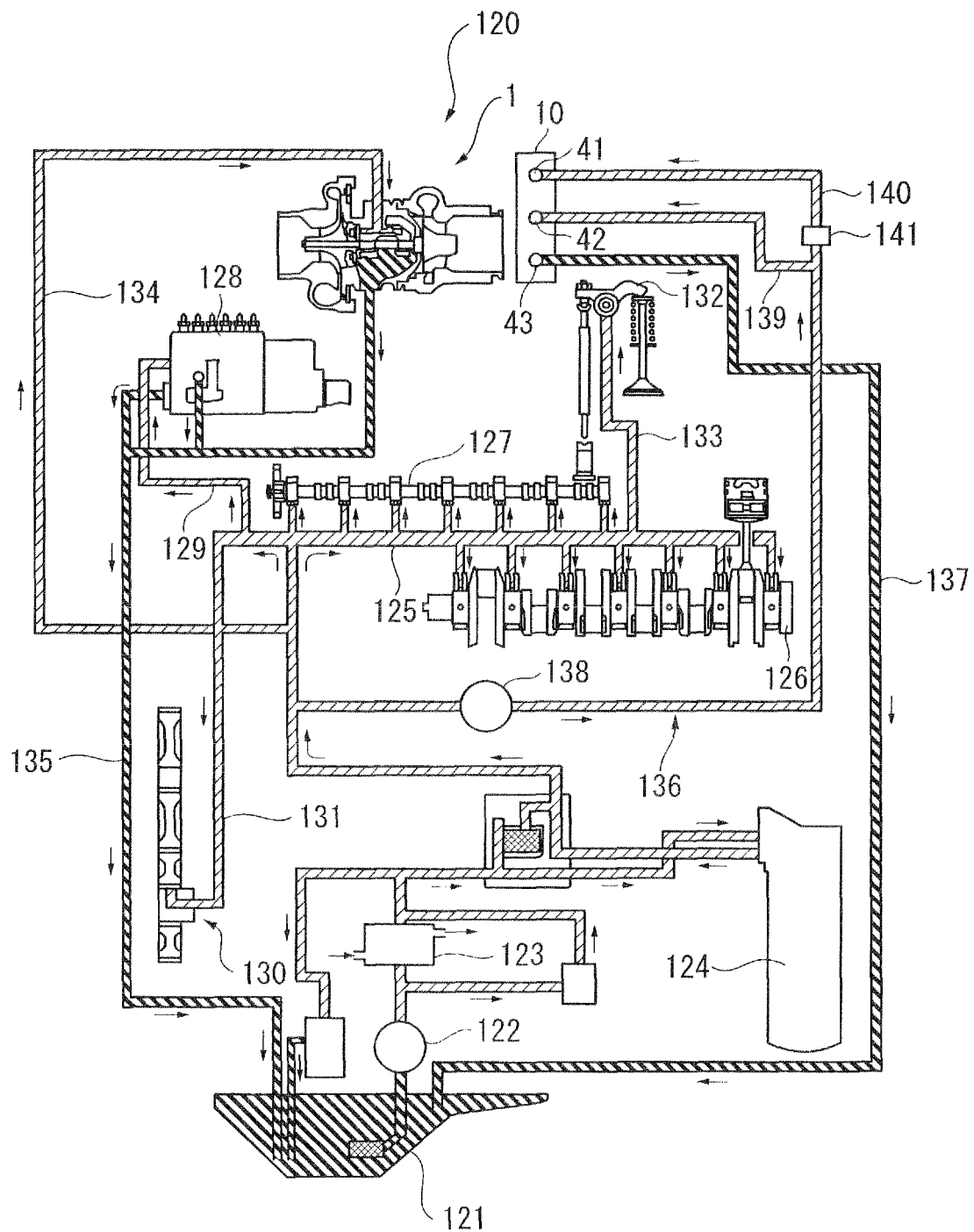
FIG. 9 is a schematic view showing a lubrication circuit of an engine.

FIG. 9 schematically shows a lubrication circuit 120 of an engine in which the variable geometry turbocharger 1 of this exemplary embodiment is installed. In the lubrication circuit 120, a lubricating oil in the oil pan 121 is pumped up by the pump 122 and supplied to a main gallery 125 via an oil cooler 123 and an oil filter 124. The lubricating oil from the main gallery 125 mainly lubricates a crankshaft 126 and a camshaft 127.

The lubrication circuit 120 includes the following paths that are branched from the main gallery 125: an injector-side path 129 for lubricating a cam drive section or the like in a fuel injector 128; a transmission-mechanism-side path 131 for lubricating a power transmission mechanism 130 that includes a timing gear; a rocker-arm-side path 133 for lubricating the rocker arm 132; a turbocharger-side path 134 for lubricating a bearing portion that supports the shaft 8 of the variable geometry turbocharger 1; and a first drain path 135 for returning the lubricating oil from the variable geometry turbocharger 1 and the fuel injector 128 to the oil pan 121. In addition, in this exemplary embodiment, a pressure oil supply path 136 for supplying a portion of the lubricating oil to the hydraulic servo drive device 10 as a drive pressure oil and a second drain path 137 for returning the pressure oil to the oil pan 121 from the drain port 43 of the hydraulic servo drive device 10 are provided separately from the lubrication circuit 120.

In other words, in this exemplary embodiment where the pressure oil for driving the hydraulic servo drive device 10 is fed by a portion of an engine lubricating oil, the path for supplying the pressure oil is the pressure oil supply path 136 branched before the main gallery 125. A boost pump 138 is provided adjacent to a base end of the pressure oil supply path 136, and the pressurized pressure oil is supplied to the pump port 42 of the hydraulic servo drive device 10 through a driving pressure path 139 adjacent to a distal end of the pressure oil supply path 136. A discharge pressure of the pump 122 is approximately in the range of 196 to 294 kN/m$^2$ (2 to 3 kg/cm$^2$), and a discharge pressure after pressurization by the boost pump 138 is approximately 1470 kN/m$^2$ (15 kg/cm$^2$). Here, the distal end of the pressure oil supply path 136 is branched into the driving pressure path 139 for supplying toward the pump port 42 and a pilot pressure path 140 for supplying a pilot pressure to the pilot port 41 of the hydraulic servo drive device 10. For this reason, the pilot pressure path 140 is provided with the proportional pressure control valve 141 for generating the pilot pressure. By applying a predetermined electric current to the proportional pressure control valve 141, a pilot pressure in the range of 0 to 1470 kN/m$^2$ (0 to 15 kg/cm$^2$) corresponding to the electric current can be generated to control the pressure of the pilot pressure path 140. By controlling the pilot pressure, the pilot spool 20 can be moved to a position corresponding to the pilot pressure. Consequently, another oil pressure source is not required by pressurizing the lubricating oil of the engine by the boost pump 138.

Second Exemplary Embodiment

Figure 10:
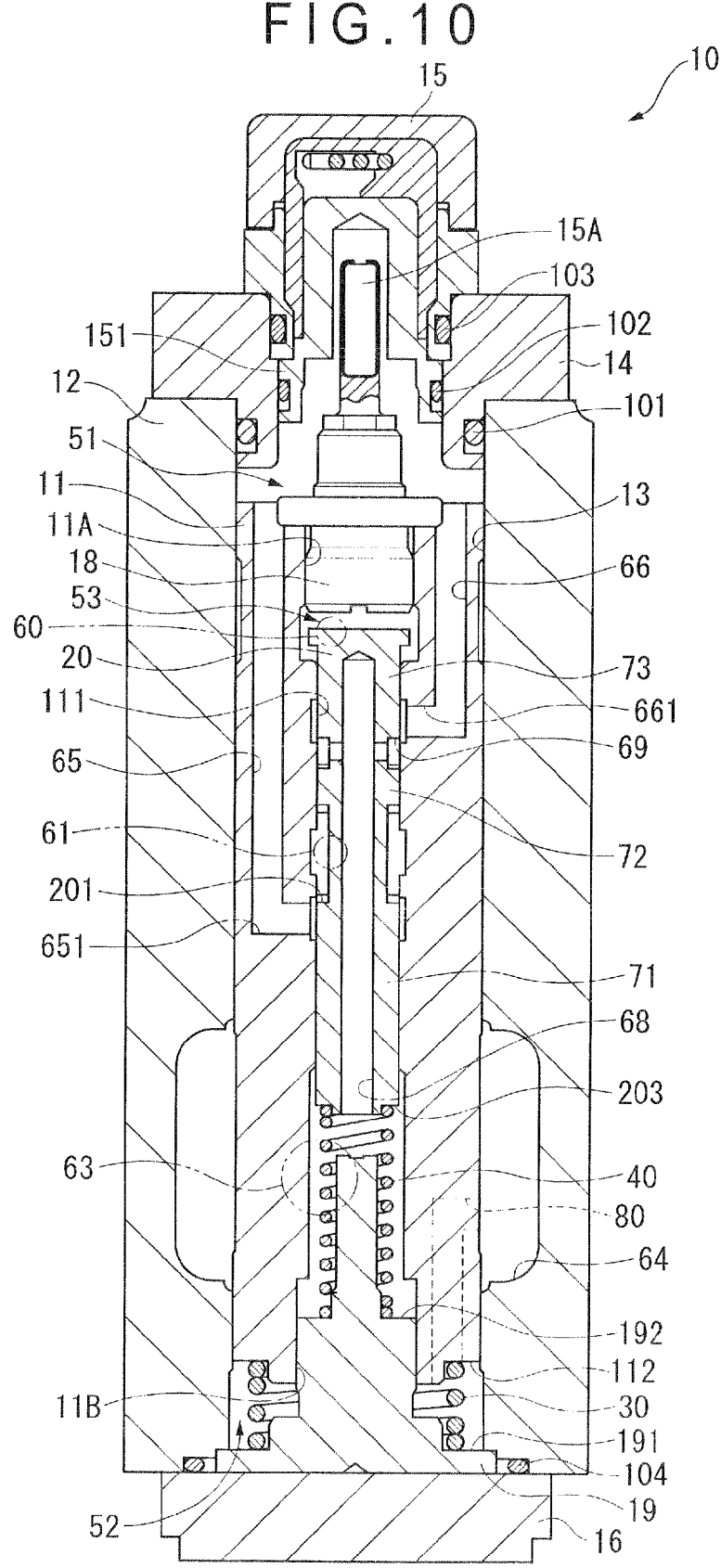
FIG. 10 is a cross sectional view showing a hydraulic servo drive device according to a second exemplary embodiment of the invention.
Figure 11:
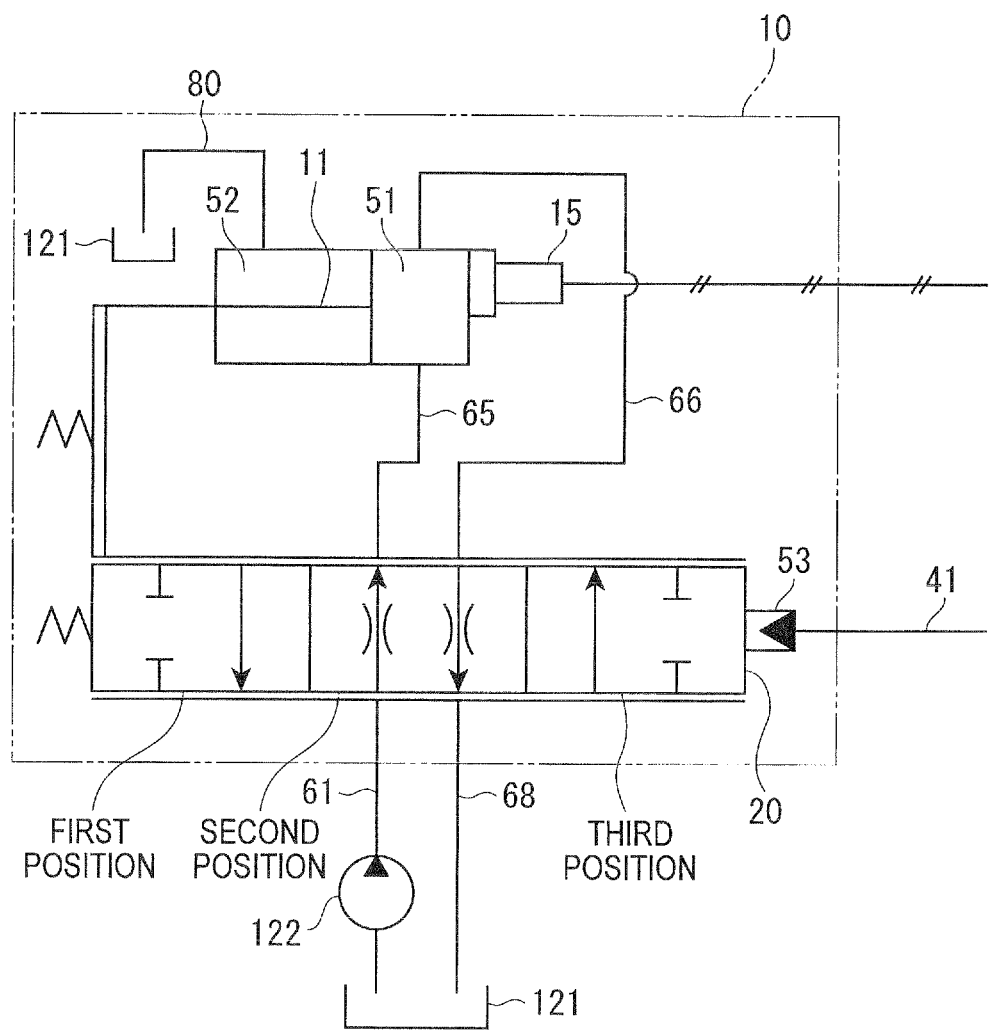
FIG. 11 illustrates a hydraulic circuit showing a three-port, three-position servo valve.

FIG. 10 illustrates a hydraulic servo drive device 10 according to a second exemplary embodiment of the invention. FIG. 11 illustrates hydraulic circuit of the hydraulic servo drive device 10. A four-port, three-position servo valve is used in the hydraulic servo drive device 10 according to this exemplary embodiment.

In the hydraulic servo drive device 10 of this exemplary embodiment, the servo piston 11 is shaped corresponding to the four-port, three-position servo valve. Specifically, the second piston oil path 67 (FIG. 7) provided in the first exemplary embodiment is not provided in this exemplary embodiment, and the second hydraulic chamber 52 (FIG. 7) of the first exemplary embodiment is communicated with the shallow groove 64 adjacent to the drain via a communicating path 80, whereby oil is flowed in and out of the second hydraulic chamber 52 in accordance with the movement of the servo piston 11, which does not disturb the movement of the servo piston 11.

In this exemplary embodiment, for lowering the pilot spool 20 from the balanced state shown in FIG. 10, the pilot pressure in the pilot hydraulic chamber 53 is increased, thereby lowering the pilot spool 20 against the biasing force of the spring 40. When the pilot spool 20 is lowered, an opening degree at which the oil path 651 of the first piston oil path 65 is communicated with the groove 201 of the pilot spool 20 is increased, thereby increasing a flow of the oil supplied from the pump 122 into the first hydraulic chamber 51. After the oil is supplied into the first hydraulic chamber 51, when the downward force urging the servo piston 11 downwards (the working pressure on the first hydraulic chamber 51) is larger than the upward force urging the servo piston 11 upwards (the total force of the force by the working pressure on the second hydraulic chamber 52 and the force of the spring 30), the servo piston 11 is lowered. In other words, in the first exemplary embodiment, the oil in the second hydraulic chamber 52 supplied through the second piston oil path 67 (FIG. 7) is drained through the return oil path 68, however, in this exemplary embodiment, the oil in the second hydraulic chamber 52 is discharged through the communicating path 80 and the servo piston 11 is lowered in accordance with the pilot spool 20 against the biasing force of the spring 30.

On the other hand, for moving the pilot spool 20 upwards from the balanced state shown in FIG. 10, by decreasing the pilot pressure in the pilot hydraulic chamber 53, a force working on the pilot spool 20 (the pilot pressure) becomes smaller than the biasing force of the spring 40, thereby moving the pilot spool 20 upwards. When the pilot spool 20 is moved upwards, communication between the oil path 651 of the first piston oil path 65 and the groove 201 of the pilot spool 20 is interrupted, and the oil path 661 of the discharge circulating oil path 66 and the groove 69 are communicated. Accordingly, the oil from the pump 122 is not supplied to the first hydraulic chamber 51, and the oil in the first hydraulic chamber 51 is drained through the return oil path 68 of the pilot spool 20. When the downward force urging the servo piston 11 downwards (the working pressure on the first hydraulic chamber 51) becomes smaller than the upward force urging the servo piston 11 upwards (the total force of the force by the working pressure (a drain pressure) on the second hydraulic chamber 52 and the force of the spring 30), the servo piston 11 is moved upwards. In other words, in the first exemplary embodiment, the oil from the pump 122 is supplied through the second piston oil path 67 (FIG. 7), however, in this exemplary embodiment, the servo piston 11 is moved upwards with following the pilot spool 20 by the biasing force of the spring 30.

Also in this exemplary embodiment, since the first piston oil path 65 is slightly communicated with the groove 201 of the pilot spool 20 and the discharge circulating oil path 66 is slightly communicated with the groove 69 of the pilot spool 20, the oil is constantly circulated in the first hydraulic chamber 51, so that the surroundings of the stroke sensor 15 can be cooled and the stroke sensor 15 can be prevented from being heated to high temperatures.

The hydraulic servo drive device 10 is shown as a hydraulic circuit view in FIG. 11. The hydraulic servo drive device 10 includes the servo piston 11, the pilot spool 20, the stroke sensor 15 and the pilot port 41, which constitutes a four-port, three-position servo valve.

In FIG. 11, at a second position of the pilot spool 20, the center upper port is connected to the first piston oil path 65 and the center lower port is connected to the pressure oil path 61, whereby the first piston oil path 65 and the pressure oil path 61 are communicated with each other, so that the oil from the pump 122 is supplied to the first hydraulic chamber 51. Further, since a right upper port is connected to the discharge circulating oil path 66 and a right lower port is connected to the return oil path 68, the discharge circulating oil path 66 and the return oil path 68 are communicated, so that the oil in the first hydraulic chamber 51 is drained to the oil pan 121 via the return oil path 68.

When the pilot pressure in the pilot hydraulic chamber 53 is increased from the state shown in FIG. 11, a third position of the pilot spool 20 is moved toward the left of the drawing to a position where the second position is located before the movement. With this movement, since a left upper port is connected to the first piston oil path 65 at the third position and a left lower port is connected to the pressure oil path 61, the first piston oil path 65 and the pressure oil path 61 are communicated, so that the oil from the pump 122 is supplied to the first hydraulic chamber 51. Moreover, since a right upper port is connected to the discharge circulating oil path 66 and a right lower port is connected to the return oil path 68, communication between the discharge circulating oil path 66 and the return oil path 68 is interrupted, so that the oil in the first hydraulic chamber 51 is not drained.

When the pilot pressure in the pilot hydraulic chamber 53 is decreased from the state shown in FIG. 11, the first position of the pilot spool 20 is moved toward the right of the drawing to the position where the second position is located before the movement. With this movement, since the left upper port is connected to the first piston oil path 65 at the first position and the left lower port is connected to the pressure oil path 61, communication between the first piston oil path 65 and the pressure oil path 61 is interrupted, so that the oil from the pump 122 is not supplied to the first hydraulic chamber 51.

Further, since the right upper port is connected to the discharge circulating oil path 66 and the right lower port is connected to the return oil path 68, the discharge circulating oil path 66 and the return oil path 68 are communicated, so that the oil in the first hydraulic chamber 51 is drained to the oil pan 121 via the return oil path 68.

Third Exemplary Embodiment

Figure 12:
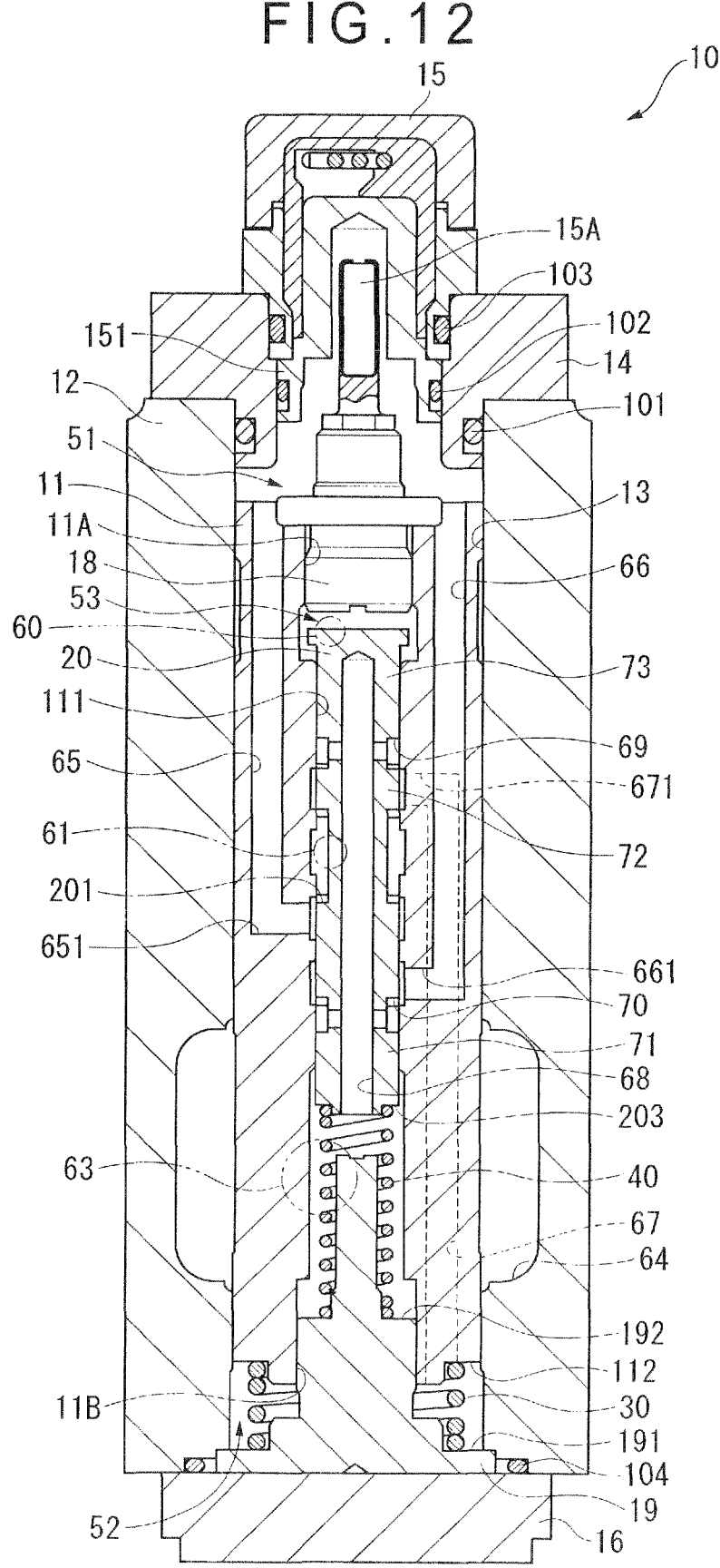
FIG. 12 is a cross sectional view showing a hydraulic servo drive device according to a third exemplary embodiment of the invention.

FIG. 12 shows a hydraulic servo drive device 10 according to a third exemplary embodiment, in which a six-port servo valve is also used.

However, the hydraulic servo drive device 10 of this exemplary embodiment includes a groove 70 between the first and second spool lands 71 and 72 of the pilot spool 20, in which the discharge circulating oil path 66 is communicated with the groove 70. Even in this exemplary embodiment, since the first piston oil path 65 is slightly communicated with the groove 201 of the pilot spool 20 and the discharge circulating oil path 66 is slightly communicated with the groove 70 of the pilot spool 20, the same advantage can be obtained as in the first exemplary embodiment.

Fourth Exemplary Embodiment

Figure 13:
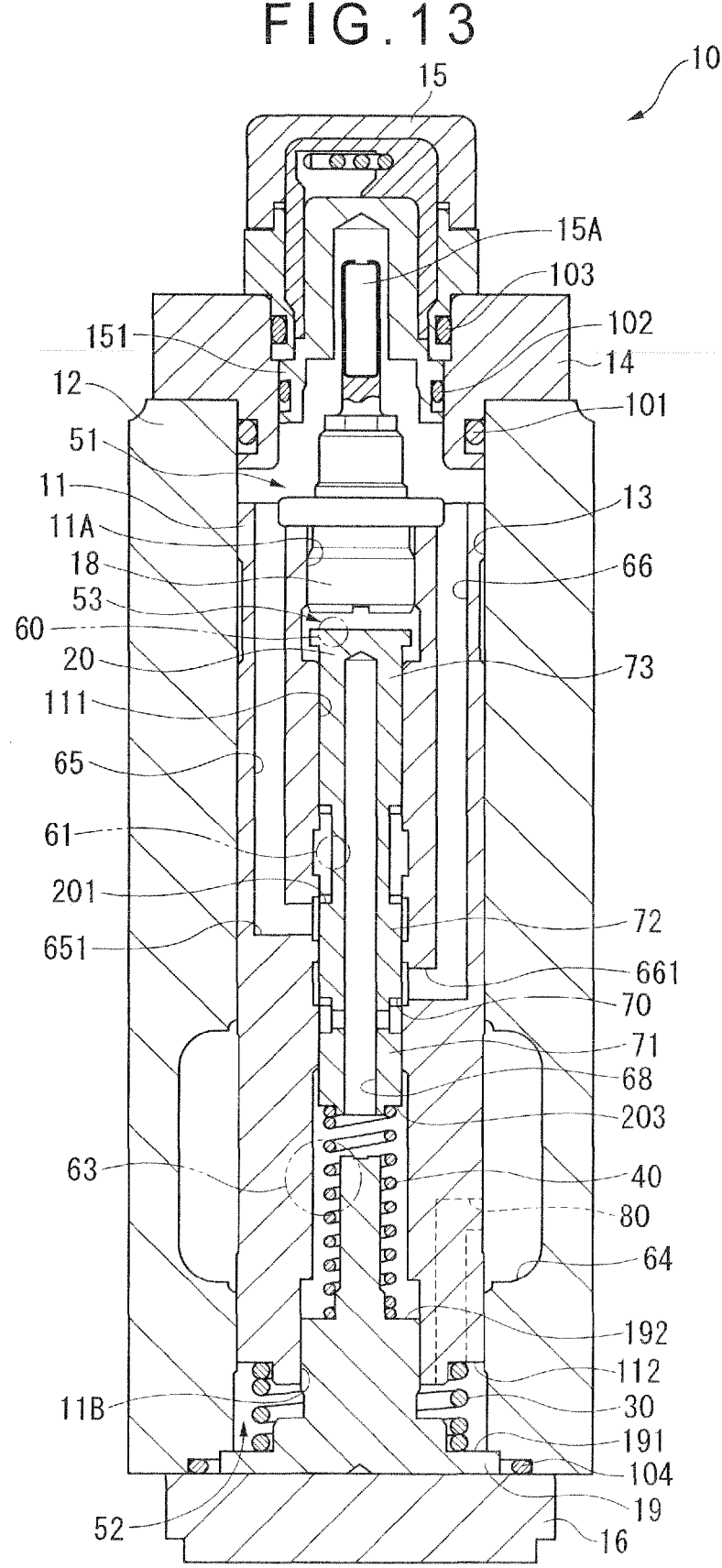
FIG. 13 is a cross sectional view showing a hydraulic servo drive device according to a fourth exemplary embodiment of the invention.

FIG. 13 shows a hydraulic servo drive device 10 according to a fourth exemplary embodiment, in which a four-port servo valve is used.

In the hydraulic servo drive device 10 of this exemplary embodiment, the discharge circulating oil path 66 is communicated with the first hydraulic chamber 51 and the groove 70 between the first and second spool lands 71 and 72. The other components are the same as in the second exemplary embodiment and the same advantages can be obtained as in the second exemplary embodiment.

Although the best arrangement, method and the like for carrying out the invention have been described above, the scope of the invention is not limited thereto. In other words, although particular embodiments of the invention are mainly illustrated and described, a variety of modifications may be made by those skilled in the art on shapes, amounts, and other detailed arrangements of the embodiment set forth above without departing from the scope of the inventive idea and the object of the invention.

Accordingly, the above description limiting shapes, amounts and the like is exemplary description for facilitating understanding of the invention and does not limit the scope of the invention, so that description with names of members without all of or a portion of the limitations such as limitations on shapes or amounts are included in the scope of the invention.

For instance, in the respective exemplary embodiments, the first piston oil path 65 and the groove 201 of the pilot spool 20 are designated to be slightly communicated with each other and the discharge circulating oil path 66 and the groove 69 or the groove 70 of the pilot spool 20 are designated to be slightly communicated with each other, but may be interrupted from each other with a slight mutual overlapping. Even with this arrangement, by repeated minute vibrations of the pilot spool 20 on the pilot pressure control, the first piston oil path 65 and the groove 201 are communicated, and the discharge circulating oil path 66 and the groove 69 or the groove 70 of the pilot spool 20 are communicated. Accordingly, the oil is circulated little by little in the first hydraulic chamber 51, resulting in the same advantage as in the above exemplary embodiments.

In the variable geometry turbocharger 1 of the respective exemplary embodiments, the movable ring 86 is slid by the slide mechanism 50 to alter the opening area of the nozzle 82, but the arrangement of the variable geometry turbocharger 1 is not limited thereto. The variable geometry turbocharger 1 may be arranged to alter the opening area by swinging a plurality of the nozzle vanes with use of a swing mechanism.

Moreover, in the above exemplary embodiments, the hydraulic servo drive device 10 is used in the variable geometry turbocharger 1, but may be used in an EGR valve device.

The invention claimed is:
1. A variable geometry turbocharger, comprising:
  exhaust inlet walls provided facing to each other at a nozzle at an outer side of a turbine wheel;
  a plurality of nozzle vanes disposed between the exhaust inlet walls at a predetermined interval along a circumferential direction of the turbine wheel;
  a slide mechanism that advances and retracts, in a facing direction, one of the exhaust inlet walls relative to the other of the exhaust inlet walls; and
  a hydraulic servo drive device for driving the slide mechanism, the hydraulic servo drive device comprising:
    a pilot spool that is slid by a pilot pressure and switches between supply and shutoff of oil;
    a biasing unit that biases the pilot spool;
    a servo piston that is slid in accordance with the pilot spool;
    a detector that detects a displacement of the servo piston;
    a pump hydraulic chamber into which oil for moving the servo piston is flowed;
    a pump port to which oil from a pump is supplied;
    a piston oil path that communicates the pump port with the pump hydraulic chamber;
    a discharge circulating oil path that communicates the pump hydraulic chamber supplied with the oil with a drain port when the pump port and the pump hydraulic chamber are communicated with each other and the oil from the pump is supplied to the pump hydraulic chamber via the piston oil path; and
    a housing that houses the servo piston;
  wherein:
    the detector includes: a stator that is provided on the housing, and a movable member that is attached on an end of the servo piston via an attachment member to move with the servo piston, wherein the movable member generates a magnetic field that is detectable by the stator;
    the pump hydraulic chamber is formed, in the housing, between the movable member provided on the servo piston and the stator provided on the housing;
    a center hole penetrating along a sliding direction and housing the pilot spool is formed in the servo piston; and
    a pilot hydraulic chamber in which the pilot pressure works is formed between an end of the pilot spool and the movable member provided on the servo piston in the center hole of the servo piston.

2. The variable geometry turbocharger according to claim 1, wherein oil for driving the hydraulic servo drive device is a lubricating oil of an engine in which the hydraulic servo drive device is installed.

3. The variable geometry turbocharger according to claim 2, wherein the lubricating oil is pressurized and supplied to the hydraulic servo drive device.

4. The variable geometry turbocharger according to claim 1, wherein the pump port and the drain port are communicated with each other when the pilot spool and the servo piston are balanced.

5. The variable geometry turbocharger according to claim 1, wherein the piston oil path and the discharge circulating oil path are provided in the servo piston.

6. The variable geometry turbocharger according to claim 4, wherein the piston oil path and the discharge circulating oil path are provided in the servo piston.

* * * * *